Oct. 22, 1957  W. F. OLSON ET AL  2,810,397
NYLON PUMP VALVE WITH SPRING RETAINER
Filed Nov. 17, 1955
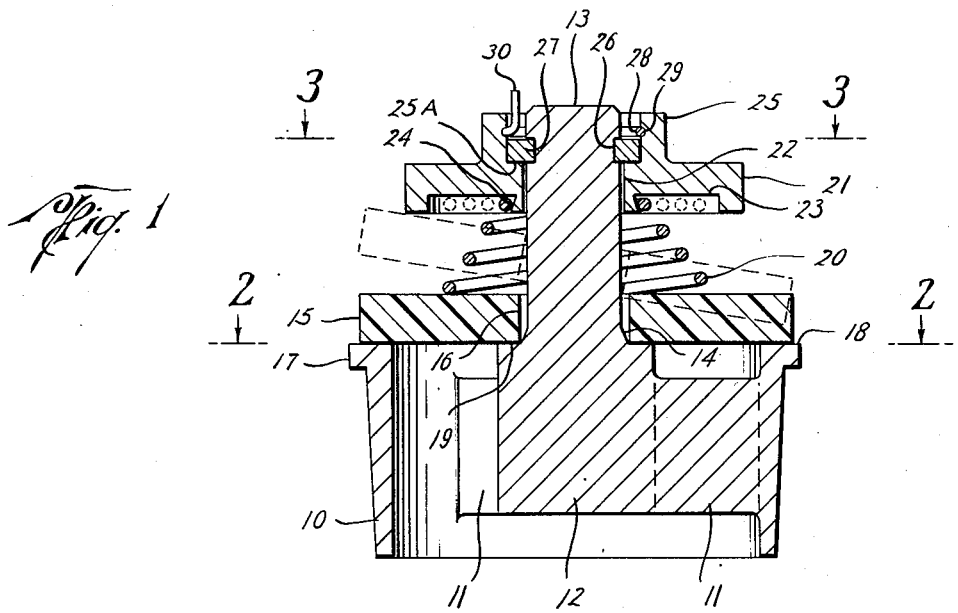
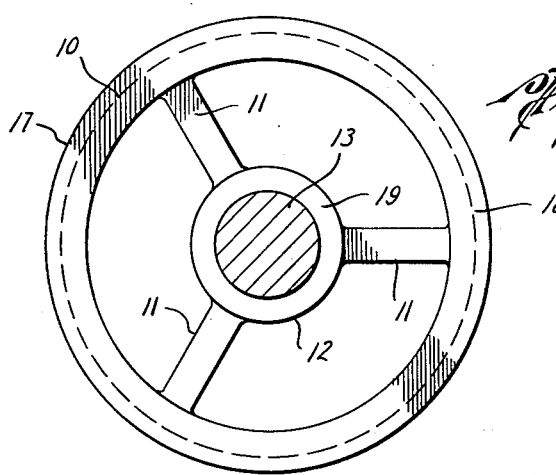
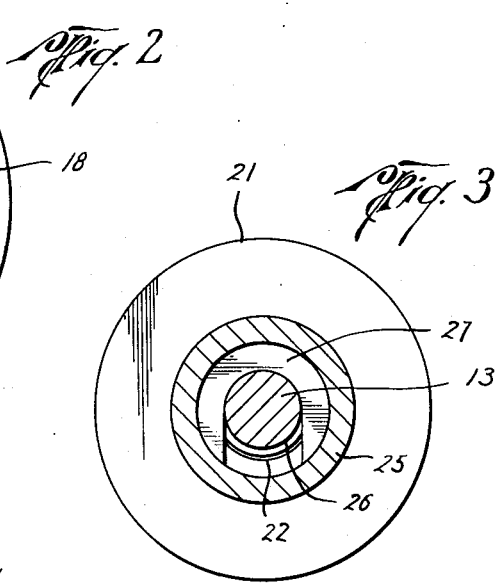
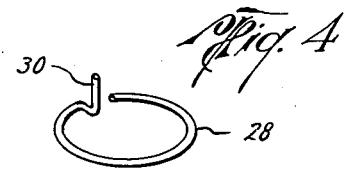
Wallace F. Olson
William L. Martin
INVENTORS
BY Murray Robinson
ATTORNEY

United States Patent Office

2,810,397
Patented Oct. 22, 1957

2,810,397

NYLON PUMP VALVE WITH SPRING RETAINER

Wallace F. Olson, Oklahoma City, and William L. Martin, Tulsa, Okla., assignors, by mesne assignments, to Line Scale Company, Inc., Oklahoma City, Okla., a corporation of Oklahoma Application November 17, 1955, Serial No. 547,444

1 Claim. (Cl. 137—540.11)

This invention pertains to valves, and more particularly to check valves, such as used in pump inlets and outlets.

It is an object of the invention to provide such a valve which will have a long life regardless of the nature of the fluids controlled thereby.

It is a further object of this invention to provide such a valve which will stay together even in the event of failure of the valve, thereby avoiding damage to the pump or other apparatus with which the valve is used.

Another object of the invention is to provide such a valve that will be reliable in operation and easy to maintain and repair.

Other objects and advantages of the invention will become apparent from the following description of a preferred embodiment thereof, reference being made to the accompanying drawing wherein:

Figure 1 is a vertical section through a valve embodying the invention;

Figure 2 is a section on line 2—2 of Figure 1;

Figure 3 is a section on line 3—3 of Figure 1; and

Figure 4 is a perspective of a snap ring used in the invention.

Referring to Figure 1 there is shown a valve seat ring 10 made preferably of brass or stainless steel. The seat ring has a plurality of webs 11 integral therewith which come together at the center of the seat ring forming a hub 12. Integral with the hub 12 is a guide pin 13 which extends above the upper surface of the seat ring. The juncture 14 of the hub 12 with the guide pin 13 is tapered or conical forming a valve centering means.

Around the guide pin 12 is disposed a valve body or disc 15 which is made of molded "nylon." The central aperture 16 of the valve body just fits around the largest diameter of the centering means 14. The outer diameter of the valve body is larger than the inner diameter of the valve seat but smaller than the outer diameter of the flange or lip 17 of the valve seat ring so that the valve body seats only on the smooth upper surface or seat 18 of the valve seat ring and on the smooth upper surface or support 19 on the top of hub 12.

On top of valve body 15 is a spiral helical compression spring 20 made of bronze. The change in radius of the spring is such that each coil thereof lies just outside the coil above so that the spring can be compressed to a flat disc having a thickness equal to that of the diameter of the wire forming the spring, as shown in dotted lines in Figure 1.

Above the spring is a disc shaped spring retainer and valve stop 21 made of bronze or stainless steel. The retainer has a central opening 22 making a sliding fit around the guide pin whereby the retainer is adapted to slide up and down on guide pin 13. The under surface of the retainer is recessed at 23 to receive the spring when the valve is wide open. The upper end of the spring is at all times in the recessed part of the retainer and is snapped under a lip 24 formed by undercutting the inner wall of the recess so that the spring and retainer will stay together even if the valve body 15 should break up and no longer fully support the spring from below.

There is a tubular extension 25 on the top of the retainer, the internal diameter of which is larger than that of the guide pin 13 and forming an annular shoulder 25A with the aperture 22 in the lower part of the retainer. There is a groove 26 around the guide pin and a horseshoe shaped bronze keeper 27 (see Figure 3) is inserted in this groove. Two such keepers, one at each side, may be used if desired.

Above the keeper and inside the tubular extension 25 of the spring retainer there is a stainless steel split snap ring 28 received in an annular groove 29 inside tubular extension 25. There is an upturned end or handle 30 on ring 28.

When the valve is being assembled the valve body is first placed over the guide pin, followed by the spring and its retainer. The spring is compressed by moving the retainer downwardly until the groove 26 around the top of the guide pin is exposed. The keeper or keepers are inserted and the retainer allowed to move up thereagainst under the pressure of the spring. The snap ring 28 is then inserted in groove 29.

It will be seen that should the valve body break up the spring and its retainer are prevented from falling by engagement of the snap ring with the top of the keeper 27, otherwise the retainer could drop far enough to be below the keeper, which could fall out, leaving the assembled spring and retainer free to move up over the end of the guide pin.

In operation the valve body will usually be subjected to eccentric opening pressures and the clearance between the center aperture and the guide pin allows the valve body to tip freely, as shown in dotted lines. The "nylon" valve body is remarkable in its ability to withstand the shocks of opening and closing when the body may strike the valve stop 21 or the valve seat ring at only a single point, because of its canted position. In addition, the "nylon" body is found to be almost universally resistant to abrasion, erosion, corrosion. However, when the valve body finally wears out the valve structure is such that the valve body can be easily replaced and if it is not replaced promptly when it does wear out the valve structure is such as to prevent damage to the associated pumps or other apparatus.

While a preferred embodiment of the invention has been shown and described, many modifications can be made therein by one skilled in the art without departing from the spirit of the invention, and it is desired to protect by Letters Patent all forms of the invention falling within the scope of the following claim.

We claim:

A valve comprising a seat ring having a central hub supported by webs integral with the seat ring and hub, a guide pin integral with the hub extending beyond the seat ring, the juncture of said pin and hub being tapered reducing in diameter going away from the seat ring, a centrally apertured nylon valve body disposed around said guide pin adapted to rest on the upper surfaces of said hub and seat ring, the diameter of the aperture in the valve body being a close fit to the maximum diameter of the tapered part of the juncture of the guide pin and hub, a spiral helical compression spring around the guide pin overlying the valve body with the large diameter portion thereof against the valve body, the change in radius of the spring per turn of spring being at lest equal to the diameter of the spring wire whereby the spring can be compressed to a flat disc, an apertured retainer disposed around the guide pin and overlying the small diameter end of the spring, the inner diameter of the aperture in the retainer being close to the diameter of the guide pin whereby the guide pin constrains the retainer to sliding along the guide pin, the undersurface of the retainer being recessed to receive the spring when compressed flat, the inner wall of the recess being undercut to form a lip under which is snapped the smallest diameter turn of the spring whereby the spring and retainer are connected together, a tubular extension on said retainer having an inner diameter greater than the diameter of the guide pin forming an annular shoulder with the part of the retainer adjacent said aperture therein, an annular groove around the end of the guide pin, a keeper disposed in said groove and overlying said shoulder, and a snap ring lying in an annular groove in said tubular extension end and overlying said keeper.

References Cited in the file of this patent

UNITED STATES PATENTS

| | | |
|---|---|---|
| 215,800 | Corliss | May 27, 1879 |
| 807,585 | Steedman | Dec. 19, 1905 |
| 1,116,341 | Aborn | Nov. 3, 1914 |
| 1,417,235 | England | May 23, 1922 |
| 2,082,512 | Richardson | June 1, 1937 |
| 2,725,076 | Hansen | Nov. 29, 1955 |